US011463489B2

(12) United States Patent
Totzke et al.

(10) Patent No.: US 11,463,489 B2
(45) Date of Patent: Oct. 4, 2022

(54) REAL-TIME COLLABORATION PLATFORM AND METHOD FOR OUTPUTTING MEDIA STREAMS VIA A REAL-TIME ANNOUNCEMENT SYSTEM

(71) Applicant: Unify Patente GmbH & Co. KG, Munich (DE)

(72) Inventors: Jurgen Totzke, Poing (DE); Patrick Degenkolb, Kronberg (DE); Christian Kaehler, Munich (DE)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 16/957,389

(22) PCT Filed: Dec. 20, 2018

(86) PCT No.: PCT/EP2018/086411
§ 371 (c)(1),
(2) Date: Jun. 24, 2020

(87) PCT Pub. No.: WO2019/129667
PCT Pub. Date: Jul. 4, 2019

(65) Prior Publication Data
US 2020/0322397 A1    Oct. 8, 2020

(30) Foreign Application Priority Data
Dec. 29, 2017   (DE) .................. 102017131420.2

(51) Int. Cl.
*H04L 65/1089*    (2022.01)
*H04L 12/18*    (2006.01)
(Continued)

(52) U.S. Cl.
CPC ...... *H04L 65/1089* (2013.01); *H04L 12/1895* (2013.01); *H04L 65/1023* (2013.01);
(Continued)

(58) Field of Classification Search
None
See application file for complete search history.

(56) References Cited

U.S. PATENT DOCUMENTS 8,265,938 B1 *   9/2012   Verna .................. H04W 4/06
                                                                379/49
10,706,845 B1 *  7/2020   Devaraj ................ G10L 15/30
(Continued)

FOREIGN PATENT DOCUMENTS

WO   WO-2009102557 A1 *  8/2009   ......... H04L 12/1827
WO      2014127787 A1     8/2014

OTHER PUBLICATIONS

International Preliminary Report on Patentability for PCT/EP2018/086411 dated Jun. 30, 2020.
(Continued)

*Primary Examiner* — Dhairya A Patel
(74) *Attorney, Agent, or Firm* — Buchanan Ingersoll & Rooney PC

(57) ABSTRACT

A real-time collaboration platform can utilize a collaboration application, which is adapted to permit a number of users to communicate with one another in at least one session about a predetermined topic via a network. The real-time collaboration platform can include at least one media server with a selective forwarding unit adapted for selectively forwarding media streams according to a content of a predetermined session. The media server has an interface to a media gateway that is enhanced by a real-time announcement adapter via which interface the media server can be connected to an announcement system with acoustic announcement devices such that the media streams of a predetermined session can be output via the announcement devices.

19 Claims, 2 Drawing Sheets

(51) Int. Cl.
   *H04L 65/1023* (2022.01)
   *H04L 65/1069* (2022.01)
   *H04L 65/401* (2022.01)
   *H04L 65/403* (2022.01)
   *H04L 65/65* (2022.01)

(52) U.S. Cl.
   CPC ........ *H04L 65/1069* (2013.01); *H04L 65/403* (2013.01); *H04L 65/4015* (2013.01); *H04L 65/65* (2022.05)

(56) References Cited

U.S. PATENT DOCUMENTS

| | | | | |
|---|---|---|---|---|
| 2009/0313659 | A1* | 12/2009 | Samuels | H04L 12/1845 725/78 |
| 2014/0156768 | A1* | 6/2014 | Arjunan | H04W 76/40 709/206 |
| 2015/0006610 | A1* | 1/2015 | Johnston | H04L 65/103 709/202 |
| 2015/0229487 | A1 | 8/2015 | Lickliter et al. | |
| 2015/0365244 | A1* | 12/2015 | Schmitz | H04L 65/752 715/753 |
| 2016/0261648 | A1* | 9/2016 | Ruetschi | H04M 3/563 |
| 2017/0230439 | A1* | 8/2017 | Totzke | H04M 3/568 |
| 2017/0272488 | A1* | 9/2017 | Totzke | H04N 21/41407 |
| 2017/0295284 | A1* | 10/2017 | Song | H04L 41/28 |
| 2018/0020098 | A1* | 1/2018 | Cliche | H04M 7/006 |
| 2018/0288499 | A1* | 10/2018 | Niemeyer | H04N 21/43637 |
| 2018/0295164 | A1* | 10/2018 | Li | H04L 65/1069 |
| 2018/0295413 | A1* | 10/2018 | Harkness | H04N 21/25891 |
| 2021/0082064 | A1* | 3/2021 | Briffa | G08B 5/22 |

OTHER PUBLICATIONS

International Search Report for PCT/EP2018/086411 dated Mar. 11, 2019.
Written Opinion of the International Search Authority for PCT/EP2018/086411 dated Mar. 11, 2019.
International Search Report for PCT/EP2018/086411 dated Mar. 11, 2019 (English Translation).

* cited by examiner

REAL-TIME COLLABORATION PLATFORM AND METHOD FOR OUTPUTTING MEDIA STREAMS VIA A REAL-TIME ANNOUNCEMENT SYSTEM

CROSS-REFERENCE TO RELATED APPLICATIONS

This is the U.S. national stage application of International Patent Application No. PCT/EP2018/086411, filed on Dec. 20, 2018, claiming priority to German Patent Application No. DE 102017131420.2, filed on Dec. 29, 2017.

FIELD

The invention relates to a real-time collaboration platform and a method for outputting media streams via a real-time announcement system.

BACKGROUND

In the prior art, Internet services and devices available to end users are, among other things, designed to be used for communication within company networks. A typical example of this is a Social Software based on which a so-called Business Social Software was developed as a type of business communication. In doing this, features such as a single sign-on (SSO) for users, as well as data access controls and community capabilities (e.g., for teams), were created. In addition to asynchronous communication such as Chat, the Social Software was further improved by enabling real-time communication with standardization of WebRTC in W3C (APIs) and IETF (transport protocols), such as audio/video communication, for example, from which real-time collaboration platforms for businesses were then developed. After that, in order to support team collaboration in businesses, for example, additional features such as screen sharing and the like were implemented, which further improved the productivity of a team using this type of collaboration platform.

SUMMARY

Currently used real-time collaboration platforms are typically configured to provide so-called horizontal communication services. Horizontal communication means neutral communication going out via all organizational structures, without specific functions for the business products and services spectrum. Possible integrations and federations for context-dependent enrichment of information are thereby restricted to the company's—Web-service-based, for example—internal and external Internet services.

However, it would be desirable for the real-time collaboration platforms used in businesses to be able to go beyond horizontal communication services.

One objective of the present invention is therefore to offer a real-time collaboration platform and a method for outputting media streams via a real-time announcement system, by means of which a broader use is possible.

Embodiments of the invention can achieve this objective by means of a real-time collaboration platform and a method for outputting media streams via a real-time announcement system.

Embodiments can offer a real-time collaboration platform with a collaboration application that is configured to allow multiple users to communicate with each other regarding a predefined topic in at least one session via a network, wherein the real-time collaboration platform includes at least one media server with a selective forwarding unit that is configured to selectively forward media streams based on the content of a particular session and on multiple clients, wherein the media server has an interface to a media gateway with a real-time announcement adapter, through which the media server can be connected to an announcement system with sound output devices, so that the media streams from a particular session can be sent out via proxy clients to the output devices.

Providing an interface to a real-time announcement adapter on the real-time collaboration platform's media server allows it, with the help of such a real-time announcement adapter, hereinafter designated as RTA (Real Time Announcement) adapter, to be connected to a real-time announcement (RTA) system, also known as an alarm response system (ARS), so that the real-time collaboration platform can go beyond horizontal communication services and be used for company-wide announcements, alerts, or the like. So-called real-time announcement (RTA) systems and/or alarm response systems (ARS) are used in businesses on platforms specifically configured for that purpose. As previously mentioned, RTA systems can be used in industry for safety purposes. However, the services provided by RTA systems can have many uses, such as warnings in advance of hazardous situations or making employees aware of them. In the event of immediate danger, warnings can be broadcasted over sound output devices such as loudspeakers, which are installed in the business or in public areas or facilities, for example. An additional possibility for broadcasting warnings consists of a display on users' mobile devices, which can be generated through the use of a corresponding application, for example, on a mobile terminal such as a cellular phone, in particular a smart phone, for example.

In some embodiments, it is possible to integrate the above-described services into the real-time collaboration platform so that its application capabilities are expanded, thereby generating multiple possible applications from the invented configuration, which will be described below in greater detail.

According to one preferred embodiment, the media gateway includes an interface to a WebRTC communication system.

According to another preferred embodiment, the announcement system is a real-time announcement system, in particular an alarm response system (ARS).

It is further preferred if the real-time announcement adapter has a media gateway that is configured to make WebRTC media connection protocols H.323- or SIP-compatible.

According to still another preferred embodiment, the media gateway expanded by the RTA adapter is configured to receive the content of the predetermined session if a client of the real-time announcement system is signed on to the predetermined session, in order to render a media stream, in particular an audio stream, to be output through the output devices.

Advantageously, the RTA adapter is configured to control the beginning and end of an RTA call at the request of a user on the real-time collaboration platform.

In addition, the media server and the media gateway expanded by the RTA adapter can be configured to record the predetermined session with RTA services.

In addition, it is preferred for the media server and the media gateway expanded by the RTA adapter to be configured to forward a recorded session.

According to another preferred embodiment, the real-time collaboration platform has the means to conduct an audio and/or video conference, wherein said means are configured to connect with hands-free equipment such as telephone speakers, cameras, and monitors in a conference room.

The media streams advantageously include audio streams and video streams. In addition, the real-time announcement adapter can be configured to connect the media server with visual output devices, so that video streams can be output through the visual output devices. According to a preferred embodiment, the real-time collaboration platform includes a Special Device Federation/Configuration Unit, which is configured to connect the media server with visual input/output devices, so that video streams can be used with the input/output devices on an application-specific basis.

Advantageously, the Special Device Federation/Configuration Unit makes it possible to input and output audio and video streams on an application-specific basis.

A method for outputting media streams through a real-time announcement system can include the following steps: start a collaboration session on a real-time collaboration platform; forward at least one audio stream from the collaboration session through a media server on the collaboration platform via a media gateway expanded by a real-time announcement adapter; and forward the audio stream through the real-time announcement adapter to sound input/output devices connected to it, so that media streams from the collaboration session can be used on the audio devices.

According to preferred embodiments, the method can further include the following steps:

Forward an audio stream from the collaboration session through a media server on the collaboration platform via a conference room setup;

Forward an audio stream to sound input/output devices connected to the conference room system, so that audio streams from the collaboration session can be used on those devices;

Forward a video stream from the collaboration session through a media server from the collaboration platform via a conference room setup;

Forward the video stream through the conference room setup to connected visual input/output devices, so that the video streams from the collaboration session can be used on the devices; and/or Perform application-specific configuration for selective transmission of audio and video streams from audio and video sources and sinks to a communication and collaboration platform via at least one real-time announcement system and optionally a conference room system through a Special Device Federation/Configuration Unit.

Additional features, tasks, advantages and details of the present invention will become more apparent from the following description of specific exemplary embodiments and their representation in drawings in the included figures. It is understood that features, tasks, advantages and details of individual exemplary embodiments are transferable to other exemplary embodiments and are considered to be disclosed also in connection with the other exemplary embodiments unless this is obviously inapplicable for technical or physical reasons. Accordingly, features of various exemplary embodiments can fundamentally be combined with other exemplary embodiments and the combination can also be considered an exemplary embodiment of the invention.

Advantageously, the sound output devices are components of a real-time announcement system and can be controlled and configured directly by the collaboration platform from an active collaboration session via a Special Device Federation/Configuration Unit.

Other details, objects, and advantages of the invention will become apparent as the following description of certain exemplary embodiments thereof and certain exemplary methods of practicing the same proceeds.

BRIEF DESCRIPTION OF THE DRAWINGS

The invention is described below in more detail based on preferred exemplary embodiments and with reference to the figures. The figures show.

Figure 1:
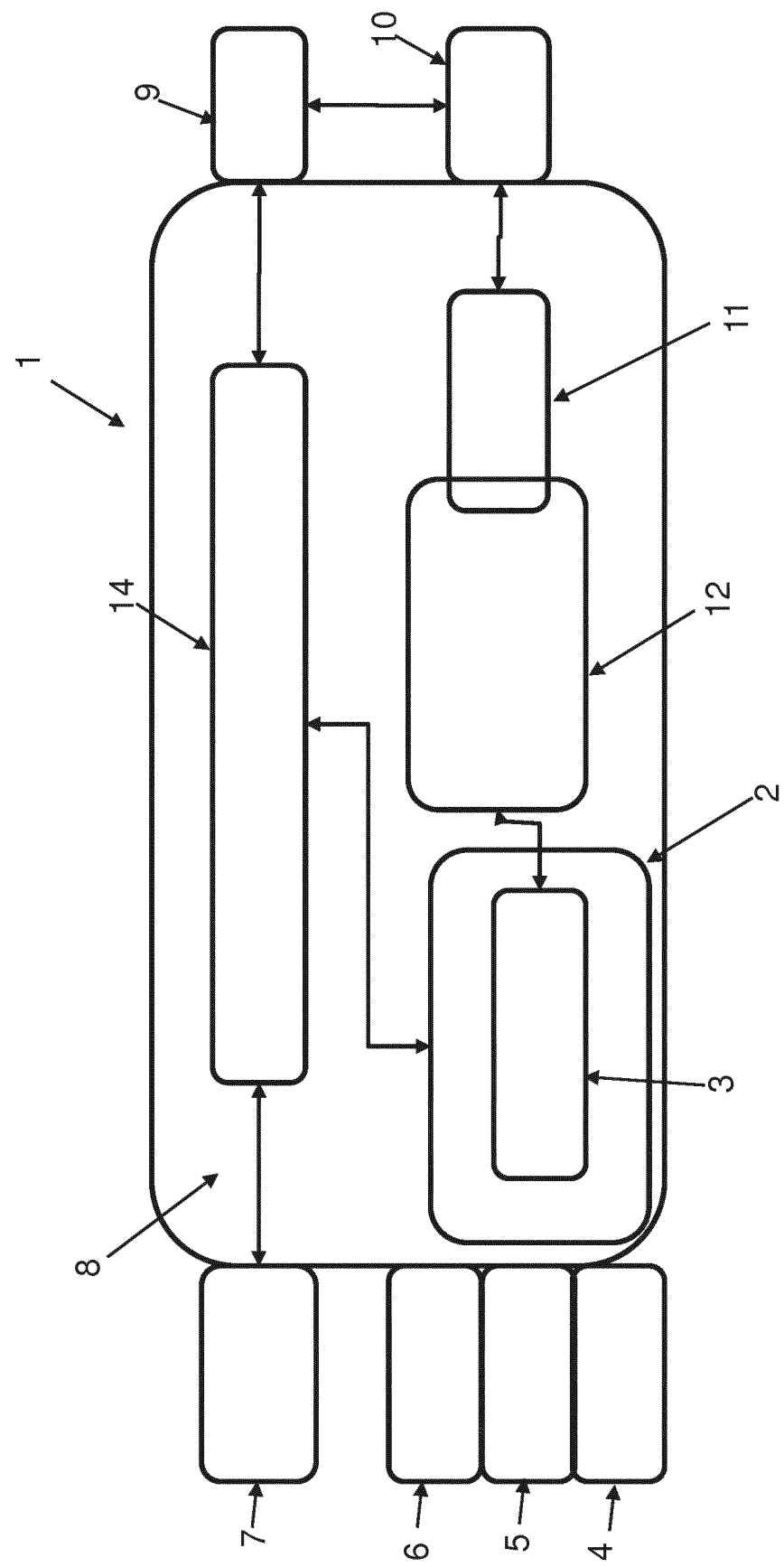
FIG. 1 a schematic representation of a real-time collaboration platform according to one embodiment of the invention.

Reference numerals used in the drawings include:

1 Communication and collaboration platform
2 Communication server
3 Media server
4 Collaboration browser client
5 Collaboration desktop client
6 Mobile collaboration client
7 Desktop client for industry applications
8 Network
9 RTA control
10 RTA subsystem
11 RTA adapter
12 Media gateway
13 Special Device Federation/Configuration Unit
14 Unit for business collaboration-expanding services
15 Conference room CMR device

DETAILED DESCRIPTION

FIG. 1 is a schematic representation of a real-time collaboration platform 1 according to one exemplary embodiment of the invention. Shown here are the functional modules and/or units of the real-time collaboration platform 1, which correspond essentially to the typical units and functions of a standard business real-time collaboration system. Accordingly, the real-time collaboration platform includes a communication server 2 and a media server 3 for selective forwarding of media streams based on predetermined session content from a communication and/or collaboration session that is or can be held on the real-time collaboration platform 1, represented here, for example, by a corresponding WebRTC-based server software running on the communication server 2. Session context and media streams can be rendered here via a dedicated desktop computer, a mobile client, or a WebRTC-compatible Web browser. For example, audio streams can be output on telephone speakers, if applicable, and video streams can be output on correspond monitors. In this case, the communication server 2 and the media server 3, together with multiple collaboration clients, equipped, for example, with speakers or hands-free equipment and/or monitors, such as the collaboration browser client 4, collaboration desktop client 5, and mobile collaboration client 6, and with a desktop client 7, here a so-called Enhanced Desktop Client 7, for example, are connected to each other through a communication network 8 for industrial applications. The Enhanced Desktop Client 7 can have operator controls, for example, used to operate the RTA system.

It should be appreciated that each server can be a computer device that includes hardware. The hardware can include a processor, non-transitory memory, and at least one communication interface. Each client can be a communication terminal device that includes hardware (e.g. a processor, non-transitory memory, and at least one communication interface such as a network communication interface for wireless and/or wired network connections) or can include software run on such a communication device.

In addition, the real-time collaboration platform 1 includes a unit 14 for the business collaboration-supporting services and an RTA system consisting of at least one device, e.g., an output device, and one controller, that is connected via an RTA-specific communication connection, here with an Internet-compatible real-time announcement (RTA) control 9, for example. The control 9 communicates with a real-time announcement (RTA) subsystem. The business collaboration-expanding services include features and functions for controlling a real-time announcement system or alarm response system.

The real-time announcement system as described above, hereinafter designated as RTA system, which consists here of the RTA control 9 and the RTA subsystem 10, is or can be connected with output devices such as speaker systems (not shown) in the RTA system, which can be placed in a room or other space, for example, or otherwise distributed, throughout an entire building or facility, for example, so that in this predetermined area, equipped with a speaker system, announcements or warnings can be issued. In addition to warnings about potential threats and safety announcements, these distributed speaker systems could also be used advantageously to broadcast in classrooms, schools, discussion groups, and similar broader public areas. Multiple RTA subsystems 10, for example, can also be used for this, e.g., in parallel.

However, in this case the RTA system must interact with the business context of the communication server 2 with respect to a predetermined communication session taking place on the real-time communication platform 1. In order to connect the RTA system to render audio streams, for example, a real-time announcement system adapter 11, hereinafter designated as RTA adapter 11, is provided. Because the current real-time collaboration systems 1 are typically built on a WebRTC-based protocol architecture, which is not, however, supported by existing RTA systems, the invention provides for an RTA adapter 11, which here is added to or integrated into a media gateway 12, on which business media services are also offered. These business media services can be supported functions for vertical communication scenarios, for example. The RTA adapter 11 must have or fulfill the following features or functions:

Protocol stack and media encoding that deviate from WebRTC should be made compatible and security systems should be adapted or transcoded:
  e.g., with WebRTC media connection protocol to H.323, SIP, or similar,
  e.g., with Opus audio encoding to G.711, G.729, or similar.
Session context should be managed in the RTA adapter (11)-expanded media gateway and recorded if applicable, if an RTA client of the RTA subsystem is part of or signs into a collaboration session, in order to then render an audio stream, video stream, or other image files.

The RTA adapter 11 should be able to start and stop a user's access to the RTA system consisting of RTA control 9 and RTA subsystem 10, based on user privileges, for example.
For this, the RTA adapter 11 can be configured to allow synchronous recording of collaboration sessions with RTA services, in which case the media server 3 should then also be configured to allow automatic asynchronous forwarding of the recorded collaboration session with RTA services.

The RTA adapter 11 configured in that manner has adequate mediation of security systems, such as conversion of media stream codes for the RTA system, and the media gateway has a standard interface to the media server 3 of the WebRTC communication system.

Figure 2:
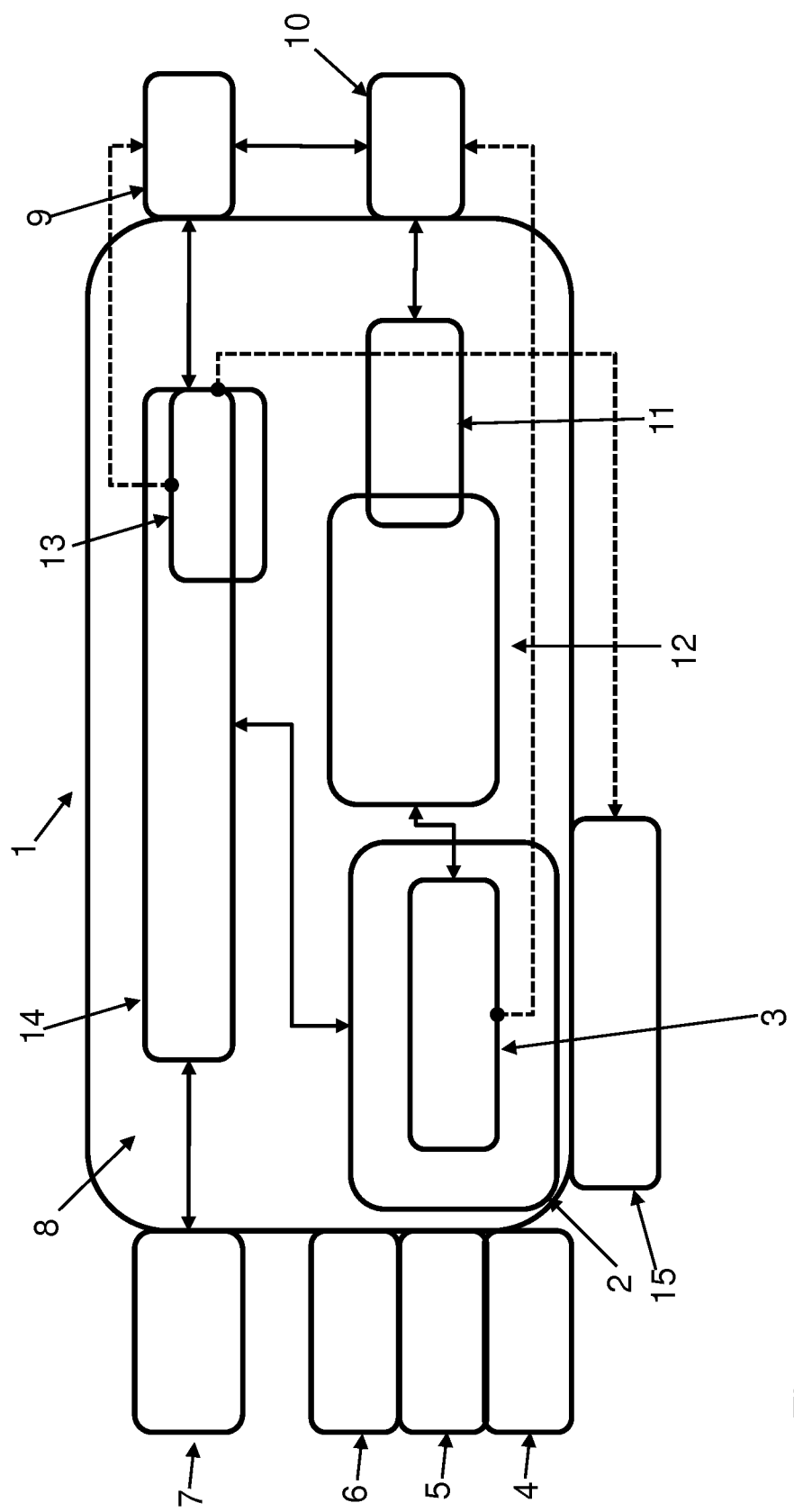
FIG. 2 a schematic representation of a real-time collaboration platform according to another embodiment of the invention.

FIG. 2 is a schematic representation of an exemplary embodiment of a real-time collaboration platform 1 according to another embodiment of the invention. The real-time collaboration platform 1 shown here is basically structured like the one already described in FIG. 1, but with the difference that here a conference room application 15, such as Circuit Meeting Room (CMR), for example, is provided in the WebRTC communication system or on the real-time collaboration platform 1 for the purpose of rendering video streams or for recording or rendering audio streams. In addition, a so-called integration and interaction service is also offered here with the specialized devices or subsystems for supporting vertical communication services (Special Device Federation/Configuration Service 13). The Special Device Federation/Configuration Service 13 gives RTA systems conference room devices in an area of interest (virtually, i.e., globally distributed) and allows the configuration of complex audio rendering systems for authorized users through their clients or through a predetermined collaboration session.

The aforementioned CMR can be implemented in WebRTC-based company real-time collaboration solutions, such as circuits in which the conference application connects with hands-free equipment like telephone speakers, video cameras, wide-angle HD video cameras and, monitors, for example, that are located in the spaces designated for them. For this, CMR is integrated wirelessly into a Circuit Session by a participant in the session, in order to display image content, for example, on a first screen with the highest possible resolution and/or display a video from active participants on a second screen (if available). In order to also integrate room loudspeaker systems, as they are used by RTA systems, wirelessly into a Circuit Session, the RTA adapter 11 described above is provided.

A coordinated combination of RTA systems and CMR devices or applications results in an improved user experience with respect to audio, video, and image content that is made available to the participant in a conference. Such systems are more easily coordinated through the aforementioned Special Device Federation/Configuration Service 13, which includes an inventory and is configured to correlate both the RTA connectors (not shown) and CMR systems in specified positions. RTA connectors comprise connections from and to RTA control, and those of the RTA adapter from and to RTA subsystems can be instructed through CMR to render and optionally to record audio streams. In this case, CMR is operated in a different mode with respect to the audio streams: when the RTA system is recording audio streams, e.g., through a microphone arrangement, audio recording is automatically muted by the telephone loudspeaker; otherwise only a rendering of audio is suppressed for reproduction on the telephone loudspeaker.

The RTA system is authenticated and authorized by the real-time collaboration system or WebRTC communication system, wherein the RTA system or RTA subsystem or their components or units must be recognized as authorized rendering devices. In addition, a privileged user group, individual privileged user, or assigned CMR can be given access to the RTA system or RTA subsystem, in order to use its equipment, such as a loudspeaker system, for example, in the context of a collaboration session.

The integration of RTA systems into WebRTC-based real-time collaboration platforms, particularly in combination with room conference systems that use adapted audio recording and rendering concepts, allows a number of application possibilities in vertical industry applications, some examples of which are described below.

For example, in a hospital a real-time consulting session can be taking place, with doctors looking at high-resolution medical image files. An additional expert needs to be called in, who is elsewhere in the hospital and not participating in the consultation. From the real-time session, this additional expert can now be paged in the hospital, via the RTA system integrated into the real-time collaboration platform 1, or its output equipment in the form of loudspeakers distributed throughout the hospital, to summon him to the consultation.

Another application case involves a call to the fire department, police, or similar force in the event of an emergency location or hazardous situation, wherein the first responder to the call is automatically added to a collaboration session, and wherein an emergency service and the alarm response system provide escape information for an affected area, for example, in which the event is taking place, or send it through the corresponding output devices. In an additional application case, monitoring cameras can also be installed in the affected area, which can be connected wirelessly to a local CMR system, for example, and can be added automatically to a predetermined session or can be activated in order to display videos of the affected area in the collaboration session.

Still another application case involves a real-time collaboration session at a company, which is output over a loudspeaker system in a work space, for example, wherein related image content or videos can be displayed on screens or monitors that are included as conference room devices in the real-time collaboration conferencing system, e.g., Circuit Meeting Room. If the RTA system is also configured for audio recording, then audio feedback can be returned to the session as well, for a more complete user experience.

A similar setup can be used in retail businesses, such as supermarkets or department stores, to broadcast product advertising or other publicity announcements via corresponding output devices, wherein video or image content provided by a central or regional center can also be shown here on corresponding monitors.

Yet another application case concerns local public transportation. Normally, e.g., commuter trains are equipped with loudspeakers and monitors to provide passengers with route information, for example. Image content could be displayed on the monitors, for example, to show alternate routes and recommendations if a train is cancelled, for example. Screens in a train that can be connected with CMR could also be equipped with a video port multiplier in order to show corresponding image content to passengers during the ride.

While certain exemplary embodiments of apparatuses, networks, communication platforms, and communication systems and methods of making and using the same have been discussed and illustrated herein, it is to be distinctly understood that the invention is not limited thereto but may be otherwise variously embodied and practiced within the scope of the following claims.

The invention claimed is:

1. A real-time collaboration platform with a collaboration application that is configured to allow multiple users to communicate with each other regarding a predefined topic in at least one session via a network, comprising:
    at least one media server, the at least one media server comprising at least one computer device having a processor connected to a non-transitory computer readable medium, the at least one media server configured to selectively forward one or more media streams based on the content of a predefined session to multiple clients, the predefined session being a collaboration session concerning the predefined topic;
    the media server having an interface to a media gateway with a real-time announcement adapter through which the media server is connectable to an announcement system with sound output devices positioned throughout an entire building or facility so that the one or more media streams from the predefined session is transmissible via the sound output devices to the entire building or facility; and
    wherein the real-time announcement adapter is configured to convert media codes of the one or more media streams for transmission to the announcement system, the media codes of the one or more media streams being WebRTC media codes and the converted media codes of the one or more media streams being media codes that are not compatible with WebRTC;
    wherein the real-time announcement adapter is configured to convert audio of the collaboration session that is in Opus format to audio in G.711 format or G.729 format; and
    wherein the at least one media server is configured to automatically forward a recording of the collaboration session asynchronously to the announcement system via the real-time announcement adapter of the media gateway.

2. The real-time collaboration platform of claim 1, wherein the media gateway includes an interface to a WebRTC communication system.

3. The real-time collaboration platform of claim 2, wherein the announcement system is a real-time alarm response system.

4. The real-time collaboration platform of claim 2, wherein the real-time announcement adapter is compatible with WebRTC media connection protocols, H.323 connection protocols, and Session Initiation Protocol (SIP) connection protocols.

5. The real-time collaboration platform of claim 1, wherein the media server and the media gateway are configured to receive session context and store it to be displayed so that a media stream is outputtable through the sound output devices when one of the clients is signed on to the predefined session.

6. The real-time collaboration platform of claim 1, wherein the real-time announcement adapter is configured to control a beginning and end of the predefined session at the request of a user.

7. The real-time collaboration platform of claim 1, wherein the media server and the media gateway are configured to record the predefined session.

8. The real-time collaboration platform of claim 7, wherein the media server and the media gateway are configured to forward a recorded session.

9. The real-time collaboration platform of claim 1, wherein the real-time collaboration platform is configured to conduct an audio and/or video conference via connections with hands-free equipment.

10. The real-time collaboration platform of claim 9, wherein the hands-free equipment includes telephone speakers, cameras, and/or monitors in a conference room.

11. The real-time collaboration platform of claim 1, wherein the media streams include audio streams and video streams, and wherein a Special Device Federation/Configuration Unit is configured to connect the media server with visual input/output devices so that video streams can be used with the input/output devices on an application-specific basis.

12. The real-time collaboration platform of claim 11, wherein the Special Device Federation/Configuration Unit, the media server, and the real-time announcement adapter are configured to connect the media server with audio input/output devices so that audio streams are useable with the input/output devices on an application-specific basis.

13. The real-time collaboration platform of claim 12, wherein the Special Device Federation/Configuration Unit is configured to facilitate input and output audio and video streams on an application-specific basis.

14. The real-time collaboration platform of claim 1, wherein the sound output devices are positioned throughout the entire building or facility so that the media streams from the predefined session is transmissible via the sound output devices to public areas.

15. A method for outputting media streams through a real-time announcement system, the method comprising:
 starting a collaboration session on a real-time collaboration platform;
 forwarding at least one audio stream from the collaboration session through a media server on the collaboration platform via a media gateway expanded by a real-time announcement adapter, the media server comprising at least one computer device having a processor connected to a non-transitory computer readable medium;
 the real-time announcement adapter converting one or more media codes of the at least one audio stream for transmission to an announcement system, the one or more media codes of the at least one audio stream being WebRTC media codes and the converted one or more media codes of the at least one audio stream being one or more media codes that are not compatible with WebRTC, wherein the real-time announcement adapter is configured to convert audio of the at least one audio stream that is in Opus format to audio in G.711 format or G.729 format;
 forwarding the at least one audio stream via the converted one or more media codes through the real-time announcement adapter to sound input/output devices of the announcement system positioned throughout an entire building or facility connected to the real-time announcement adapter so that the at least one audio stream from the collaboration session is output via the input/output devices to the entire building or facility.

16. The method of claim 15, comprising:
 forwarding the at least one audio stream from the collaboration session through a media server on the collaboration platform via a conference room setup;
 forwarding the at least one audio stream to sound input/output devices connected to the conference room system, so that audio streams from the collaboration session can be used on those devices;
 forwarding a video stream from the collaboration session through the media server via the conference room setup; and/or
 forwarding the video stream through the conference room setup to connected visual input/output devices, so that the video streams from the collaboration session can be used on the devices.

17. The method of claim 15, comprising:
 performing application-specific configuration for selective transmission of audio and video streams from audio and video sources and sinks to the real-time collaboration platform via at least one real-time announcement system and/or a conference room system through a Special Device Federation/Configuration Unit.

18. The method of claim 17, wherein the forwarding the audio stream through the real-time announcement adapter to the sound input/output devices of the announcement system so that media streams from the collaboration session are output via the input/output devices to public areas.

19. The method of claim 15, wherein the WebRTC media codes are for Opus audio encoded data of the at least one audio stream.

* * * * *